UNITED STATES PATENT OFFICE.

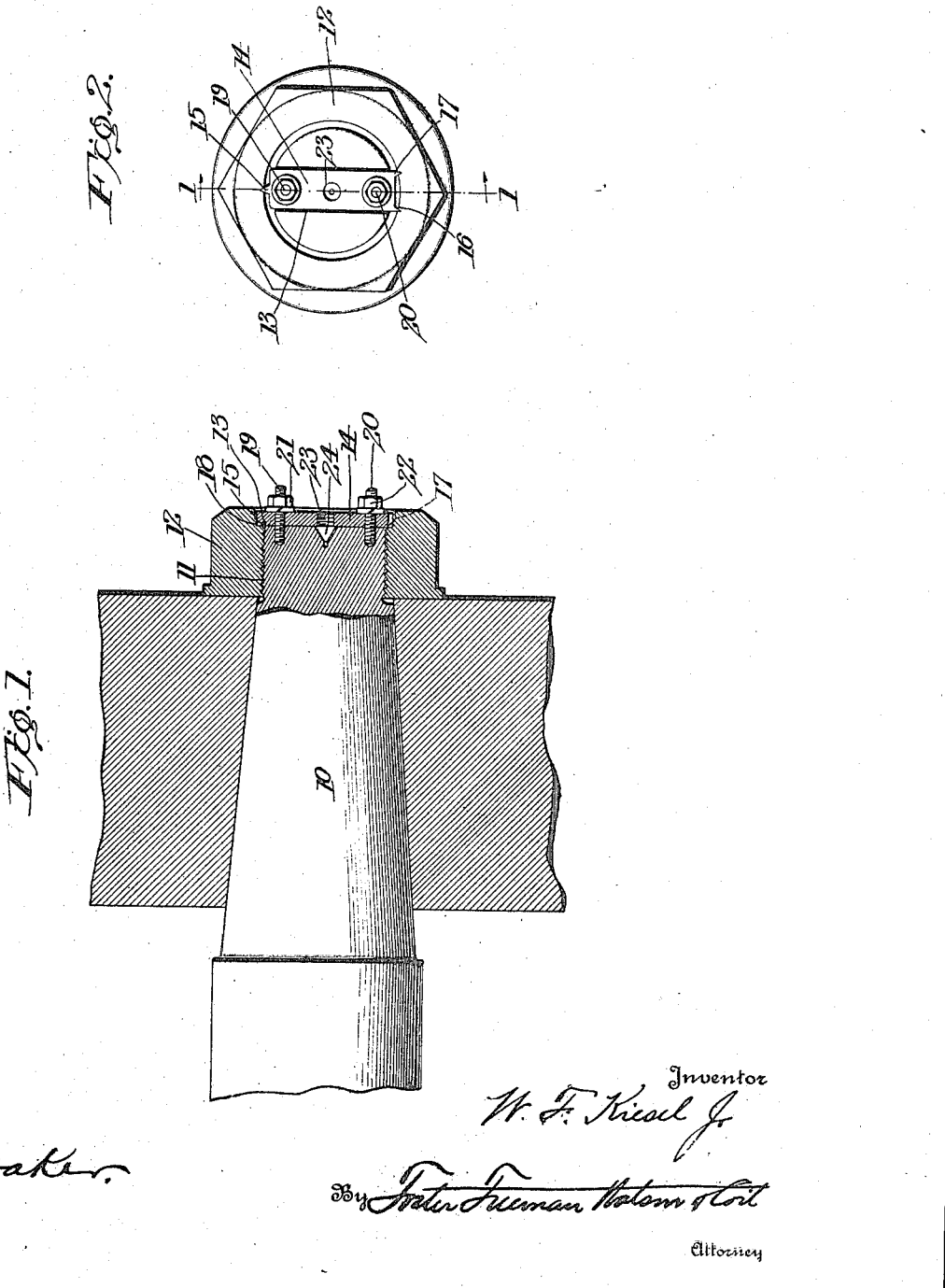

WILLIAM F. KIESEL, JR., OF ALTOONA, PENNSYLVANIA.

LOCKING DEVICE.

1,268,852.   Specification of Letters Patent.   Patented June 11, 1918.

Application filed February 7, 1917. Serial No. 147,205.

*To all whom it may concern:*

Be it known that I, WILLIAM F. KIESEL, Jr., a citizen of the United States, residing at Altoona, in the county of Blair and State of Pennsylvania, have invented certain new and useful Improvements in Locking Devices, of which the following is a description.

This invention relates to a locking device and more particularly to improvements in devices for locking a shank and collar against relative rotation.

Broadly stated, the invention comprises a shank of circular cross section, a collar mounted thereon and a member carried by the shank extending transversely thereof and having a sharp edge engaging the interior of the collar to lock the collar and shank against relative rotation.

In the drawings:

Figure 1 is a view showing the locking device in section, part of the shank being shown in elevation, the section being taken on the line 1—1 of Fig. 2.

Fig. 2 is an end elevation of the locking device.

In the preferred embodiment illustrated in the drawings 10 is a shank which may be a rod, bolt, axle or other member having a circular cross section and a threaded end 11 which has mounted thereon the collar 12, which may be interiorly threaded to thereby constitute a nut. The end of the shank 10 is formed with a transversely extending channel 13 in which is seated the transverse member 14, having at one end thereof the sharp edge 15 and at the other end the sharp edges 16 and 17. These edges project radially outside the surface of the shank. The collar 12 may be formed with a shallow counterbore 18, and when mounted on the shank, its end surface is adapted to be substantially flush with the end of the shank. The sharp edges 15, 16 and 17 are adapted to engage the interior surface of the counterbore 18 and to be embedded therein. In order to hold the transverse member 14 against displacement, it may be mounted on the studs 19 and 20, which are threaded into the end of the shank. The nuts 21 and 22 on the studs prevent the member 14 from being withdrawn laterally. This transverse member 14 may be formed with a threaded aperture 23 in register with a recess 24 in the end of the shank, to receive a threaded bolt or other similar member, whereby the transverse locking member may be withdrawn from its locking position after the nuts 19 and 20 have been removed.

In the operation of the device, the collar or nut 12 is mounted on the end of the shank with its end surface substantially flush with the end of the shank. The transverse member 14 is then driven into the channel 13 with the sharp edges 15, 16 and 17 embedded more or less in the interior surface of the counterbore 18. The said member 14 is then securely fastened in this position by screwing up the nuts 21 and 22. When it is desired to take off the collar or nut 12 or change its adjustment rotatably of the shank 10, the nuts 21 and 22 are taken off and a bolt or other similar member screwed into the threaded aperture 23. By pulling on the bolt, the member 14 may then be withdrawn from its locking position.

Although a transverse member having one sharp edge at one end and two sharp edges at the opposite end is shown, it is obvious that the arrangement of these sharp edges may be varied, the only requirement being that the transverse member have at least one sharp edge to engage the interior surface of the collar. Furthermore, although the counterbore is shown with a smooth interior surface it is obvious that the character of this surface may be varied to coöperate with the sharp edges on the transverse member.

Having thus described the invention what is claimed and desired to be secured by Letters Patent is:

1. In combination with a shank formed with a transverse channel, a collar mounted on said shank and a member in said channel having a sharp edge at each of its opposite ends embedded in the interior surface of the collar to lock the collar and shank against relative rotation, said edges being parallel to the axis of the shank.

2. In combination with a shank formed with a transverse channel, a collar having a counterbore at one end mounted on said shank, and a member in said channel having a sharp edge at one end embedded in the interior surface of the counterbore to lock the collar and shank against relative rotation, said edge being parallel to the axis of the shank.

3. In combination with a threaded shank having a transverse channel in its end, an interiorly threaded nut on said shank, and means for locking the nut and shank against relative rotation comprising a member seated in said channel and having a sharp edge at one end embedded in the interior surface of the nut.

4. In combination with a threaded shank having a transverse channel in its end, an interiorly threaded nut on said shank formed with a counterbore in one end, and means for locking the nut and shank against relative rotation comprising a member seated in said channel and having a sharp edge at one end embedded in the interior surface of the counterbore.

5. In combination with a threaded shank having a transverse channel in its end, an interiorly threaded nut on said shank formed with a counterbore and means for locking the nut and shank against relative rotation comprising a member in said channel having a sharp edge at each of its opposite ends embedded in the interior surface of the counterbore.

6. In combination with a threaded shank having a transverse channel in its end, an interiorly threaded nut on said shank formed with a counterbore and means for locking the nut and shank against relative rotation comprising a member fastened in said channel and having a sharp edge at one end engaging the interior of the counterbore, said member formed with a threaded opening to receive a bolt for withdrawing the member.

In testimony whereof I affix my signature.

WILLIAM F. KIESEL, Jr.

Copies of this patent may be obtained for five cents each, by addressing the "Commissioner of Patents, Washington, D. C."